(12) United States Patent
Shimohira et al.

(10) Patent No.: US 9,453,326 B2
(45) Date of Patent: Sep. 27, 2016

(54) WORK MACHINE

(71) Applicant: Hitachi Construction Machinery Co., Ltd., Bunkyo-ku, Tokyo (JP)

(72) Inventors: Akira Shimohira, Ryugasaki (JP); Tadayoshi Aoki, Amstelveen (NL); Hiroaki Yada, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 7 days.

(21) Appl. No.: 14/771,435

(22) PCT Filed: Apr. 4, 2014

(86) PCT No.: PCT/JP2014/059941
§ 371 (c)(1),
(2) Date: Aug. 28, 2015

(87) PCT Pub. No.: WO2014/168079
PCT Pub. Date: Oct. 16, 2014

(65) Prior Publication Data
US 2016/0010308 A1    Jan. 14, 2016

(30) Foreign Application Priority Data

Apr. 8, 2013   (JP) ................................ 2013-080396

(51) Int. Cl.
*F01N 13/00*   (2010.01)
*E02F 9/08*    (2006.01)
(Continued)

(52) U.S. Cl.
CPC ............ *E02F 9/0866* (2013.01); *B60K 13/04* (2013.01); *B62D 25/12* (2013.01); *B62D 63/02* (2013.01);
(Continued)

(58) Field of Classification Search
CPC ............. F01N 2590/08; F01N 13/009; F01N 13/1805; B60K 13/04; E02F 9/0866; E02F 9/0891; B62D 25/10
See application file for complete search history.

(56) References Cited

U.S. PATENT DOCUMENTS 4,133,547 A * 1/1979 Fox ......................... B60K 13/04
                                                   123/41.64
4,354,458 A * 10/1982 Bury ....................... B60K 13/02
                                                  123/184.38
(Continued)

FOREIGN PATENT DOCUMENTS

JP    2010-59749 A    3/2010
JP    2010-106581 A   5/2010
(Continued)

OTHER PUBLICATIONS

International Search Report dated May 27, 2014 with English translation (Four pages).
(Continued)

*Primary Examiner* — Emma K Frick
(74) *Attorney, Agent, or Firm* — Crowell & Moring LLP

(57) ABSTRACT

A work machine includes: a vehicle body frame of the work machine; an engine mounted on the vehicle body frame; an engine cover covering over a top of the engine and fixed to the vehicle body frame via a column; a first exhausting device having a tubular appearance; a second exhausting device having a tubular appearance and having a function different from that of the first exhausting device; and a bracket holding the first exhausting device in an upper holding part and the second exhausting device in a lower holding part to attach them on a bottom surface of the engine cover. The bracket integrally holds the first and second exhausting devices in such a manner that an extending direction of the first exhausting device and an extending direction of the second exhausting device are generally parallel, seen from above, and a part of the first exhausting device and a part of the second exhausting device overlap each other, seen from above, while fixing the first and second exhausting devices below the engine cover.

5 Claims, 18 Drawing Sheets

(51) Int. Cl.
*B60K 13/04* (2006.01)
*F01N 13/18* (2010.01)
*B62D 25/12* (2006.01)
*B62D 63/02* (2006.01)
*F01N 3/035* (2006.01)
*F01N 3/28* (2006.01)
*F01N 3/20* (2006.01)

(52) U.S. Cl.
CPC ........... *E02F 9/0841* (2013.01); *E02F 9/0891* (2013.01); *F01N 3/035* (2013.01); *F01N 3/2882* (2013.01); *F01N 13/1805* (2013.01); *F01N 13/1822* (2013.01); *F01N 13/1855* (2013.01); *F01N 3/2066* (2013.01); *F01N 13/009* (2014.06); *F01N 2250/02* (2013.01); *F01N 2250/14* (2013.01); *F01N 2590/08* (2013.01)

(56) References Cited

U.S. PATENT DOCUMENTS

| | | | | |
|---|---|---|---|---|
| 6,655,486 | B2* | 12/2003 | Oshikawa | B60K 11/08 180/68.1 |
| 8,141,535 | B2* | 3/2012 | Olsen | F01N 13/1805 123/195 A |
| 8,191,668 | B2* | 6/2012 | Keane | B60K 13/04 180/296 |
| 8,572,954 | B2* | 11/2013 | DeYoung | F01N 13/18 60/311 |
| 8,857,557 | B2* | 10/2014 | Sakamoto | B60K 11/04 180/296 |
| 8,915,328 | B2* | 12/2014 | Okada | E02F 9/0866 180/309 |
| 9,056,547 | B2* | 6/2015 | Kimijima | E02F 3/3411 |
| 9,103,254 | B2* | 8/2015 | Merchant | F01N 3/025 |
| 9,151,014 | B2* | 10/2015 | Arai | E02F 3/764 |
| 9,175,455 | B2* | 11/2015 | Sakai | E02F 3/7631 |
| 9,180,774 | B2* | 11/2015 | Mizuno | B60K 13/04 |
| 2010/0031644 | A1* | 2/2010 | Keane | B60K 13/04 60/295 |
| 2012/0227376 | A1 | 9/2012 | Deyoung et al. | |
| 2012/0247861 | A1 | 10/2012 | Mizuno et al. | |
| 2013/0213726 | A1 | 8/2013 | Okada | |
| 2014/0124285 | A1 | 5/2014 | Kimijima et al. | |
| 2014/0311132 | A1* | 10/2014 | Arai | E02F 3/764 60/286 |
| 2015/0075894 | A1* | 3/2015 | Kamimae | E02F 9/0833 180/309 |
| 2015/0167274 | A1* | 6/2015 | Harada | E02F 3/764 180/296 |
| 2015/0211209 | A1* | 7/2015 | Okuda | B60K 13/04 180/309 |

FOREIGN PATENT DOCUMENTS

| | | |
|---|---|---|
| JP | 2012-97413 A | 5/2012 |
| JP | 2012-184602 A | 9/2012 |
| JP | 2012-215022 A | 11/2012 |
| JP | 2013-11126 A | 1/2013 |
| JP | 2014-202002 A | 10/2014 |
| WO | WO 2011/152306 A1 | 12/2011 |

OTHER PUBLICATIONS

Hirata, "Development of Urea-SCR System for Heavy Duty Commercial Vehicles", Nissan Diesel Motor (Three pages).

* cited by examiner

WORK MACHINE

TECHNICAL FIELD

The present invention relates to a work machine.

BACKGROUND ART

Work machines having internal combustion engines such as diesel engines are provided with a muffler for muffling sound and a variety of post-processing devices for exhaust gas purification, as exhausting devices. If these exhausting devices were integrated, the weight and outer dimensions would be increased. Thus, an installation structure that is applicable for exhausting apparatuses having an increased weight and increased outer dimensions is known (see PTL1).

CITATION LIST

Patent Literature

PTL1: Japanese Laid-Open Patent Publication No. 2010-106581

SUMMARY OF INVENTION

Technical Problem

However, if a plurality of exhausting devices having respective different functions were integrated, the cost could be increased because of lack of flexibility of the integrated exhausting devices, in addition to an increase in weight and outer dimensions as described in the above-described patent literature.

Solution to Problem

A work machine according to a first aspect of the present invention comprises: a vehicle body frame of the work machine; an engine mounted on the vehicle body frame; an engine cover covering over a top of the engine and fixed to the vehicle body frame via a column; a first exhausting device having a tubular appearance; a second exhausting device having a tubular appearance and having a function different from that of the first exhausting device; and a bracket holding the first exhausting device in an upper holding part and the second exhausting device in a lower holding part to attach the first exhausting device and the second exhausting device on a bottom surface of the engine cover, wherein: the bracket integrally holds the first and second exhausting devices in such a manner that an extending direction of the first exhausting device and an extending direction of the second exhausting device are generally parallel, seen from above, and a part of the first exhausting device and a part of the second exhausting device overlap each other, seen from above, while fixing the first and second exhausting devices below the engine cover.

According to a second aspect of the present invention, in the work machine according to the first aspect, it is preferable that the bracket integrally holds the first and second exhausting devices in such a manner that a center axis extending in the extending direction of the first exhausting device and a center axis extending in the extending direction of the second exhausting device do not overlap each other, seen from above.

According to a third aspect of the present invention, in the work machine according to the first or second aspect, it is preferable that the engine is a diesel engine; the first exhausting device is an oxidation catalyst device; and the second exhausting device is a muffling device.

According to a fourth aspect of the present invention, in the work machine according to the first or second aspect, it is preferable that: the engine is a diesel engine; the first exhausting device is an urea SCR (Selective Catalytic Reduction) device; and the second exhausting device is a DPF (Diesel Particulate Filter) device.

According to a fifth aspect of the present invention, in the work machine according to the first or second aspect, it is preferable that: the engine is a diesel engine; the first exhausting device is an oxidation catalyst device; and the second exhausting device is an urea SCR (Selective Catalytic Reduction) device.

Advantageous Effects of Invention

According to the present invention, the bracket integrally holds the first and second exhausting devices in such a manner that an extending direction of the first exhausting devices and an extending direction of the second exhausting device are generally parallel, seen from above, and a part of the first exhausting device and a part of the second exhausting device overlap each other, seen from above, while fixing the first and second exhausting devices below the engine cover. In this way, an increase in weight and size of the work machine can be suppressed.

DESCRIPTION OF EMBODIMENTS

Figure 1:
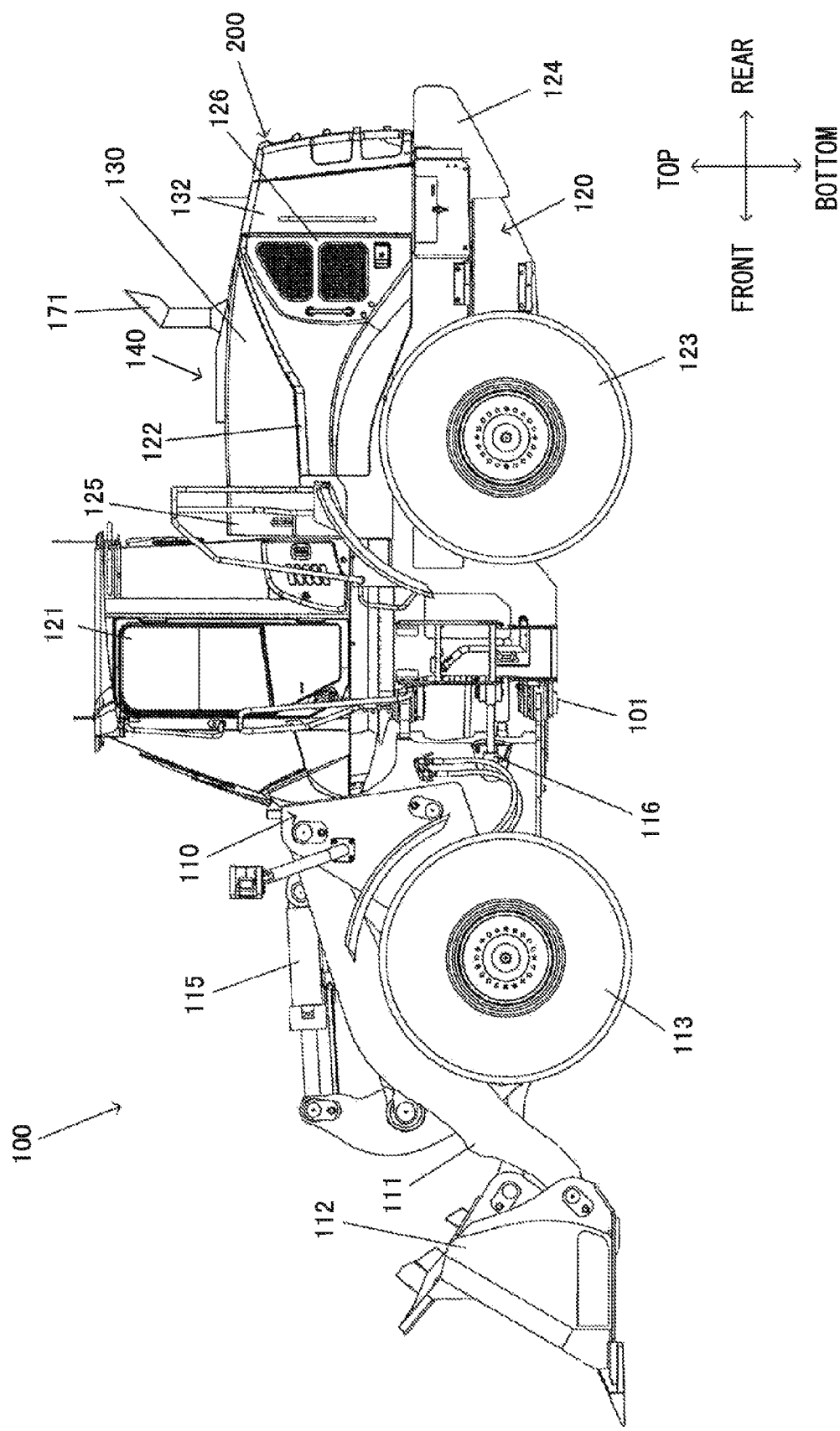
FIG. 1 is a side view of a wheel loader as one example of the work machine.
Figure 2:
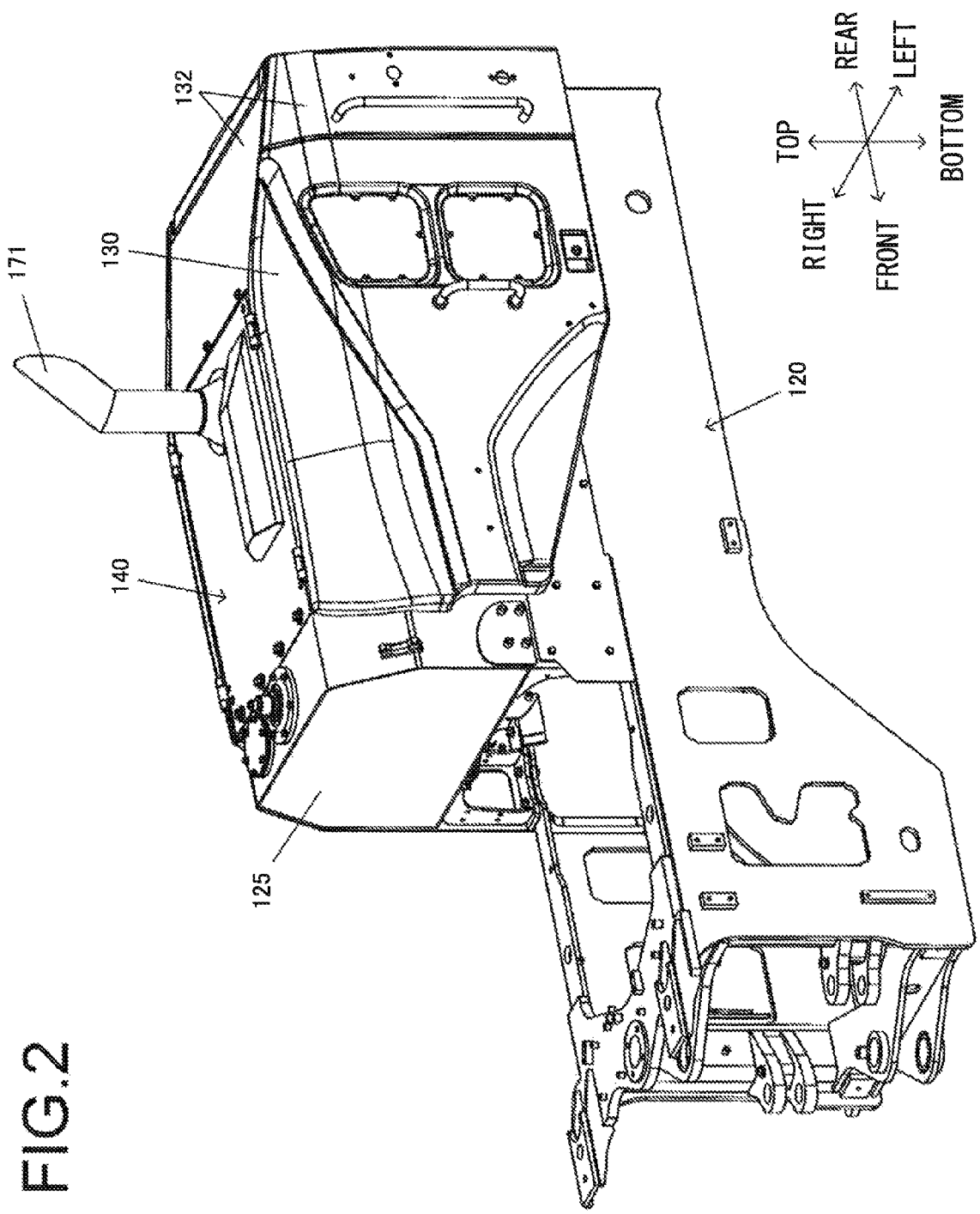
FIG. 2 is a perspective view showing an appearance of a building cover and a cooler building cover, which are attached to a rear vehicle body (frame) of the wheel loader 100.

Referring to FIGS. 1 to 16, an embodiment of a work machine according to the present invention will be described. FIG. 1 is a side view of a wheel loader as one example of the work machine according to this embodiment. FIG. 2 is a perspective view showing an appearance of a building cover 130 and a cooler building cover 132, which are attached to a rear vehicle body (frame) 120 of the wheel loader 100. In this embodiment, for convenience of explanation, "front", "rear", "right", "left", "top", and "bottom" will be defined as shown in the figures.

The wheel loader 100 includes a front vehicle body 110 having an arm 111, a bucket 112, a front wheel 113, and others, and a rear vehicle body 120 having an operator's cab 121, machine room (engine room) 122, a cooler chamber 126, a rear wheel 123, and others. The engine room 122 is covered by an engine hood (engine cover) 140 on its top side and by the openable/closable building cover 130 on its lateral sides (right and left sides). Upper lateral sides of the building cover 130 are configured to outwardly open about a hinge on the top, and further configured to be held in an open state by a gas spring (not shown).

A tail pipe 171 for exhausting exhaust gas is attached to the engine cover 140. The cooler chamber 126 is provided behind the engine room 122 and partitioned from the engine room 122 by a partition wall (not shown). The cooler chamber 126 is covered on its lateral sides by a part of the building cover 130 and the cooler building cover 132, and on its top side by the cooler building cover 132. A plurality of coolers (heat exchangers) and the like are provided in the cooler chamber 126. The cooler building cover 132 is open on its rear side. The opening part is covered by a grill 200 attached in an openable/closeable manner.

A counterweight 124 is attached behind the rear vehicle body 120. An hydraulic oil tank 125 is provided in front of the engine room 122. The hydraulic oil tank 125 is provided in an upright manner on the rear vehicle body 120, for example, as shown in FIG. 2.

Figure 3:
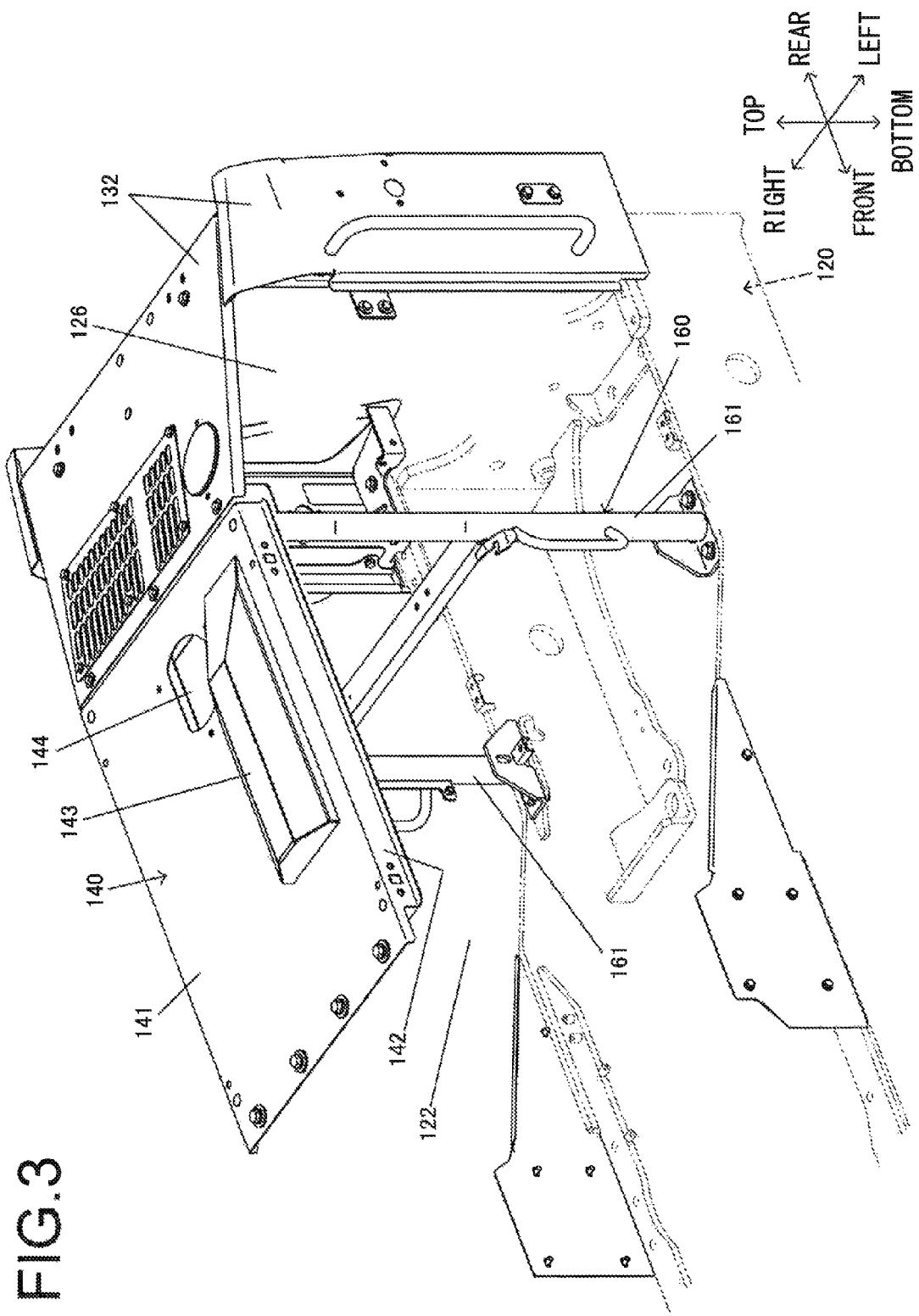
FIG. 3 is a top perspective view of an engine cover and a cooler building cover, seen from left front.
Figure 4:
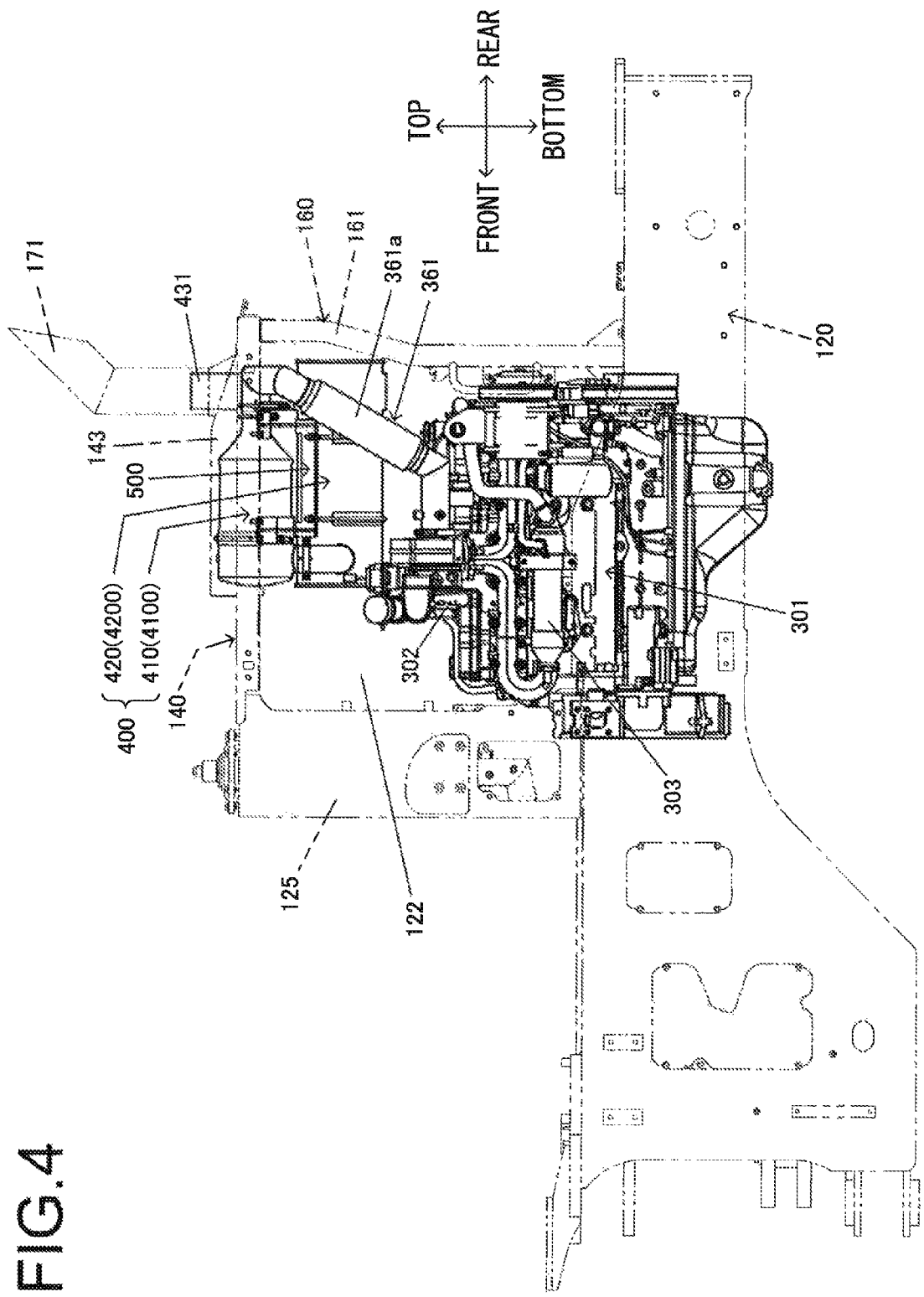
FIG. 4 is a view of an engine room, seen from left.
Figure 13:
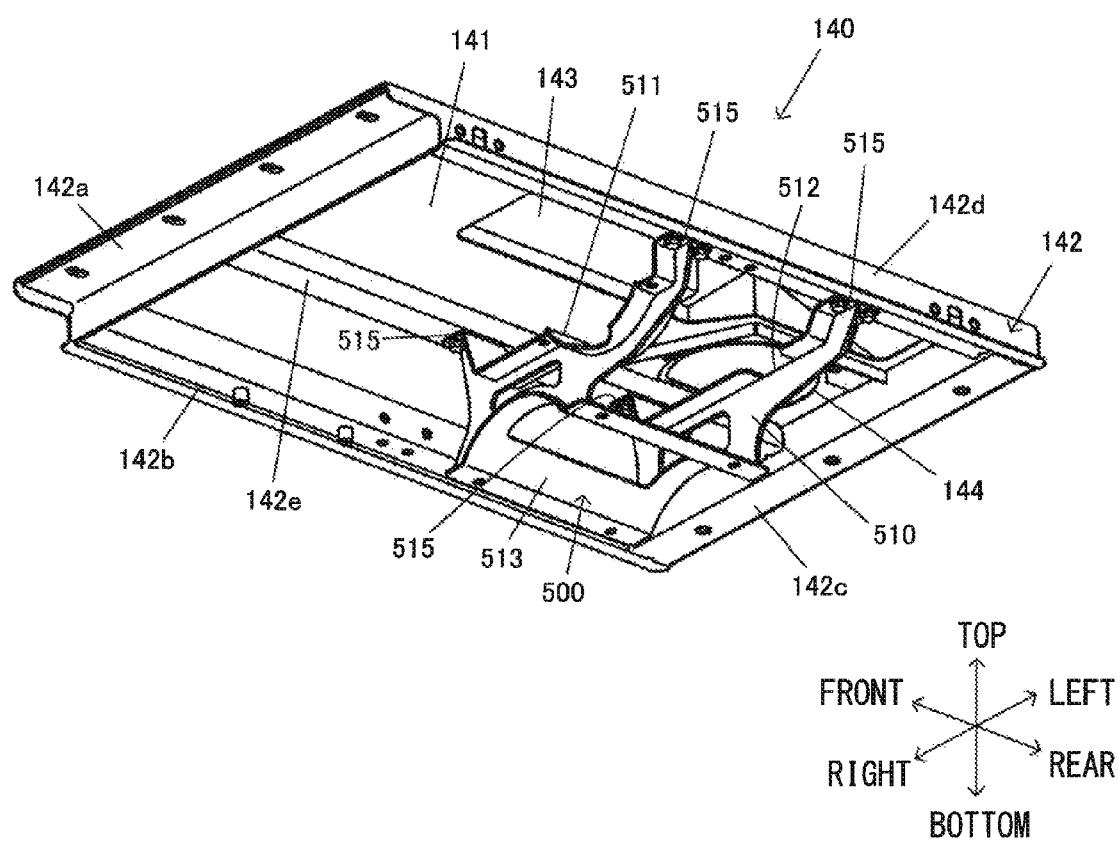
FIG. 13 is a bottom perspective view of the engine cover, seen from left front.

FIG. 3 is a top perspective view of the engine cover 140 and the cooler building cover 132, seen from left front, and FIG. 4 is a view of the engine room 122, seen from left side. Furthermore, FIG. 13 is a bottom perspective view of the engine cover 140, seen from left front, showing the engine cover 140 having an attachment bracket 500 (described below) attached thereto. The engine cover 140 includes a ceiling plate 141, and a frame 142 to which the ceiling plate 141 is attached.

The ceiling plate 141 is a plate that covers the top opening of the engine room 122. The ceiling plate 141 is provided with a protrusion 143 which protrudes upwardly therefrom and an opening part 144 which is an opening for exhausting the exhaust gas. The ceiling plate 141 is attached on the frame 142. The protrusion 143 is provided to prevent interference with a first exhausting device 410 of an exhausting apparatus 400 described below. The above-described tail pipe 171 for exhausting the exhaust gas is attached to the periphery of the opening part 144 (see FIGS. 2 and 3).

The frame 142 is a reinforcing member of the ceiling plate 141 and includes four reinforcing members 142a to 142d which are assembled to form a generally rectangular shape. The frame 142 further includes one reinforcing member 142e extending in the longitudinal direction (front-rear direction) between two reinforcing members 142b, 142d extending in the longitudinal direction among the four reinforcing members.

A bottom surface in the front end of the engine cover 140 abuts against the top surface of the hydraulic oil tank 125 so that the engine cover 140 is supported by the hydraulic oil tank 125, while the engine cover 140 is supported on its rear end by a building cover supporting member 160. The building cover supporting member 160 is a generally inverse U-shaped member having a pair of right and left columns 161, each of which is provided in an upright manner on the rear vehicle body 120. The building cover supporting member 160 reinforces the engine cover 140 (particularly, the reinforcing member 142c) in terms of strength. The above-described partition wall (not shown) is fixed on the rear surface of the building cover supporting member 160 by means of bolting, for example.

The arm 111 rotates in the vertical direction (swings up and down) by actuation of an arm cylinder (not shown) and the bucket 112 rotates (damps or clouds) in the vertical direction by actuation of a bucket cylinder 115. The front vehicle body 110 and the rear vehicle body 120 are rotatably coupled to each other with a center pin 101, and the front vehicle body 110 is bent in the right and left directions with respect to the rear vehicle body 120 by expansion and contraction of a steering cylinder 116.

Figure 5:
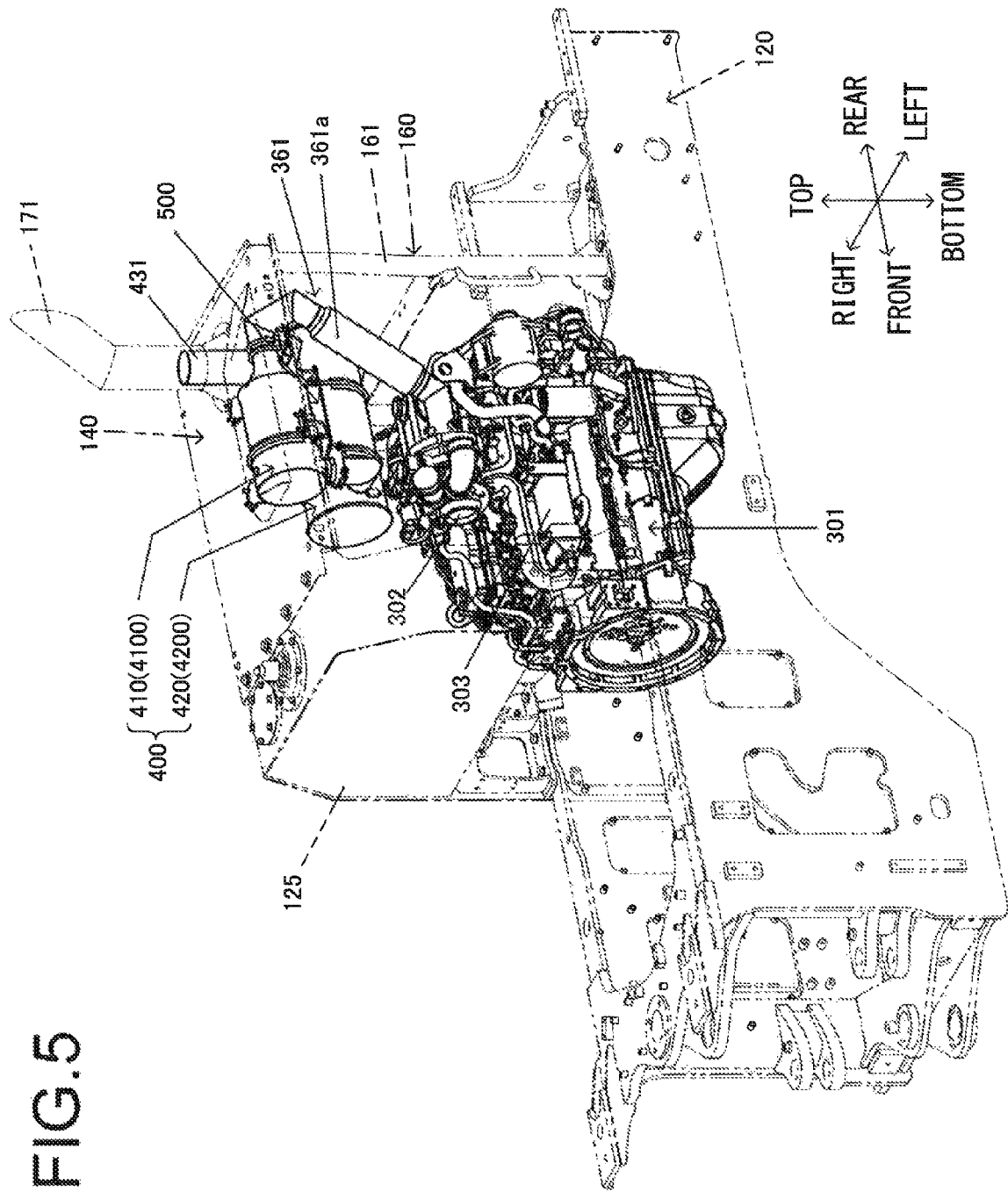
FIG. 5 is a view of the engine room, seen from left front.
Figure 6:
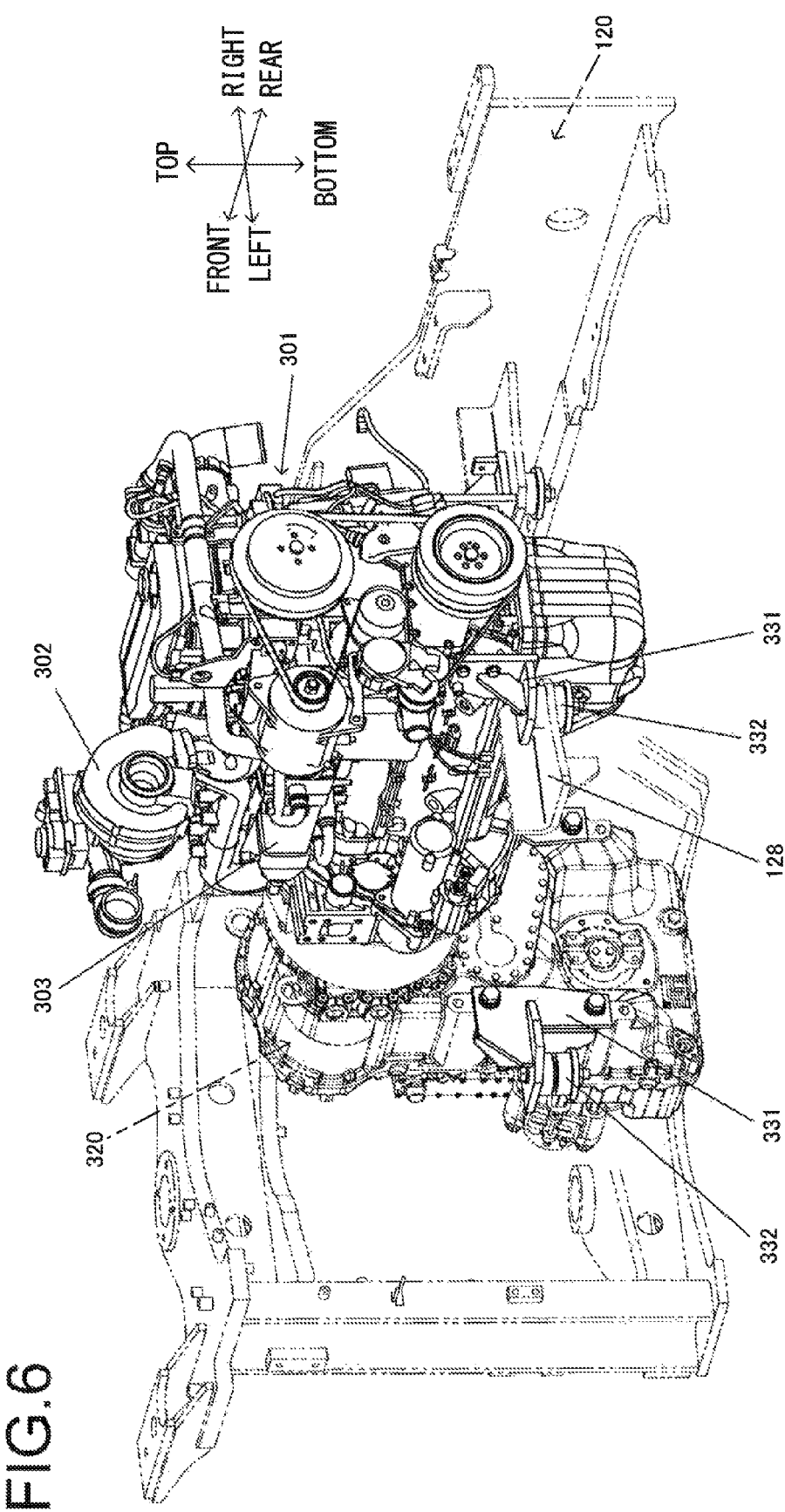
FIG. 6 is a view of the engine, seen from left rear.

FIG. 5 is a view of the engine room 122, seen from left front, and FIG. 6 is a view of an engine 301, seen from left rear. Furthermore, FIG. 7 is a view of intake/exhaust accessories provided above the engine 301, seen from left front, FIG. 8 is also a view of the intake/exhaust accessories, but seen from right rear, and FIG. 9 is a view of inter alia, the exhausting apparatus 400 among the exhaust accessories, seen from front.

The engine 301 in this embodiment is a diesel engine. The engine 301 and a transmission 320 attached to the engine 301 are attached to a bracket 128 of the rear vehicle body 120 via an attachment bracket 331 and an engine mount rubber 332 (FIG. 6). A variety of accessories are attached to the engine 301, including a turbocharger 302 and an EGR (Exhaust Gas Recirculation) cooler 303, for example.

Figure 7:
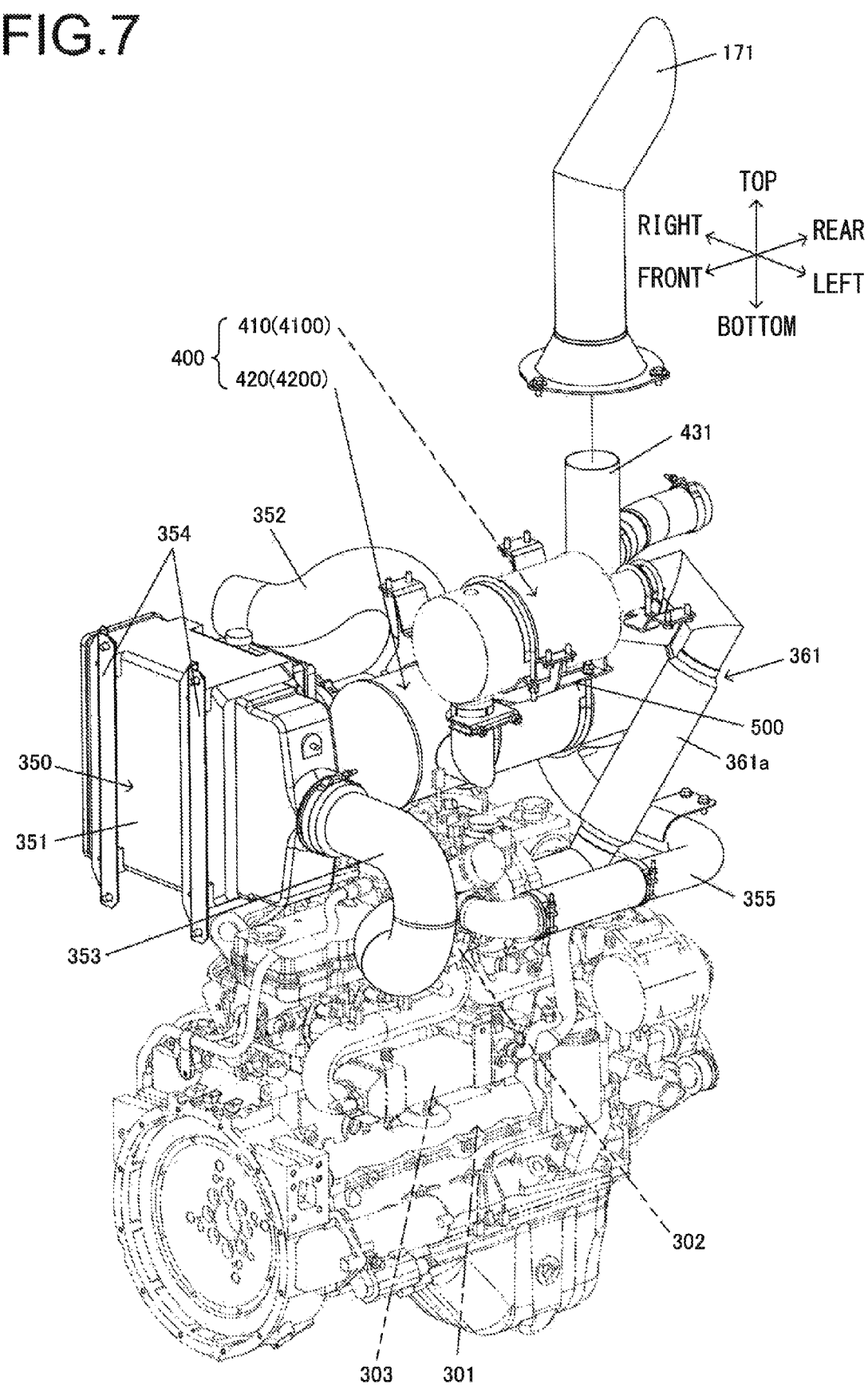
FIG. 7 is a view of intake/exhaust accessories provided above the engine, seen from left front.
Figure 8:
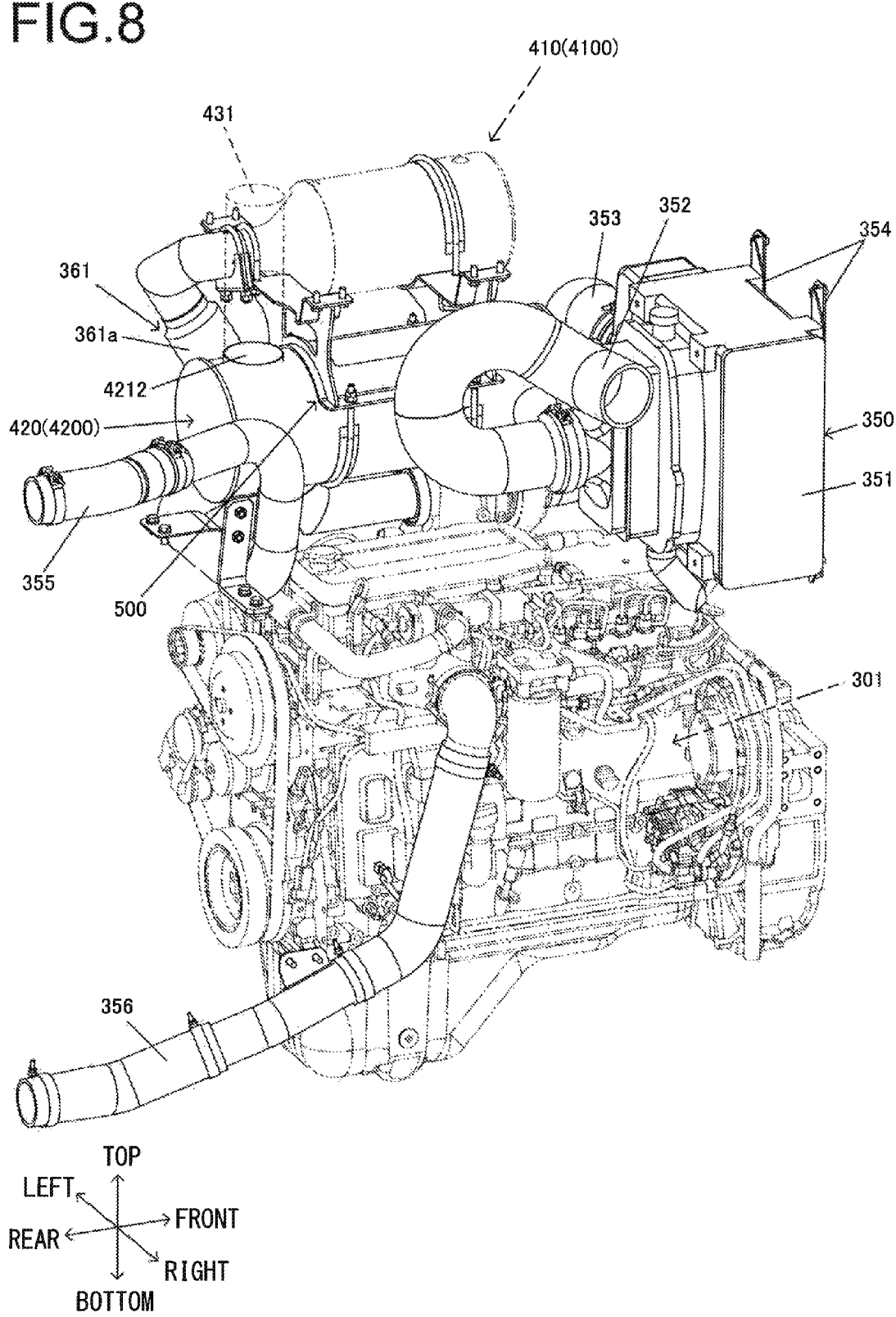
FIG. 8 is a view of the intake/exhaust accessories, seen from right rear.
Figure 9:
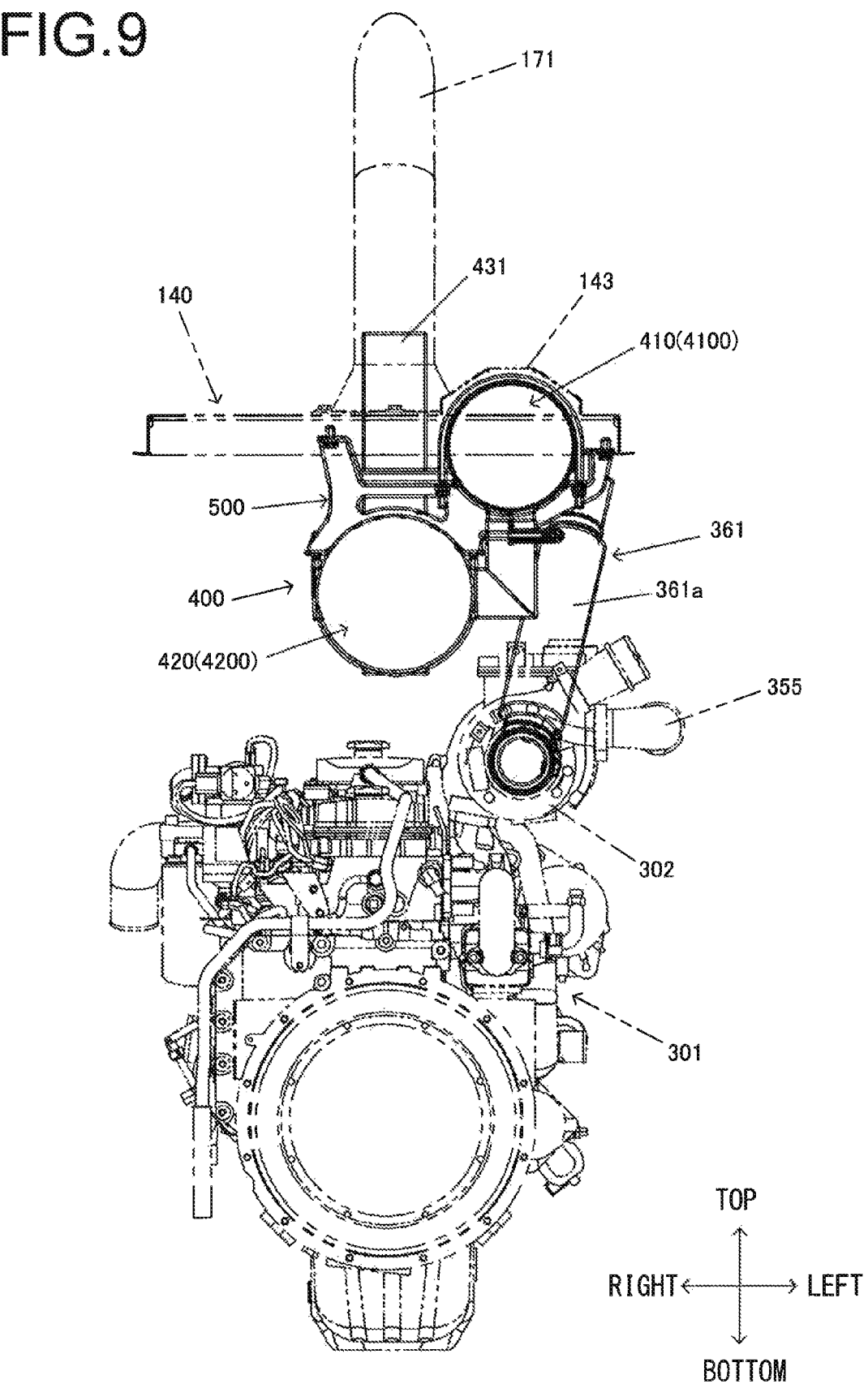
FIG. 9 is a view of, inter alia, an exhausting apparatus among the exhaust accessories, seen from front.

As particularly shown in FIGS. 7 and 8, an air cleaner 350, which is an intake accessory, and the exhausting apparatus 400, which is an exhaust accessory, are provided above the engine 301 in the engine room 122. The air cleaner 350 includes a filter (not shown) for filtering intake air and an air cleaner box 351 for holding the filter. An intake tubing 352 for guiding the external air is connected to the back surface of the air cleaner box 351 of the air cleaner 350, and an intake tubing 353 for guiding the filtered air to the turbocharger 302 is connected to the left side surface of the air cleaner box 351. Although not shown, the air cleaner box 351 is attached to the back surface of the hydraulic oil tank 125 via a bracket 354.

The air filtered by the air cleaner 350 is supplied to the turbocharger 302 through the intake tubing 353 as described above, and then turbocharged there. The air turbocharged by the turbocharger 302 is delivered to an intercooler (not shown) through an intake tubing 355. In this case, the intercooler is provided in the cooler chamber 126. The air cooled by the intercooler is supplied to the engine 301 through an intake tubing 356 and others.

After passing through the turbocharger 302, the exhaust gas exhausted from the engine 301 is delivered to the exhausting apparatus 400 through an exhaust tubing 361. The gas is then purified in the exhausting apparatus 400 and exhausted to the atmosphere through the tail pipe 171 after reduction in sound volume of the gas. The exhausting apparatus 400 will be described in detail below. Moreover, in the middle of the exhaust tubing 361, a bellow tube 361a is provided for compensating for the difference between vibrating modes of the engine 301 and the exhausting apparatus 400.

—Exhausting Apparatus 400—

The exhausting apparatus 400 includes a first exhausting device 410 and a second exhausting device 420. In this embodiment, an oxidation catalyst device 4100 with a muffling feature (hereinafter referred to simply as an oxidation catalyst or DOC (Diesel Oxidation Catalyst)) is used as the first exhausting device 410 and a muffling device 4200 is used as the second exhausting device 420. As described below, the first exhausting device 410 (the oxidation catalyst 4100) and the second exhausting device 420 (the muffling device 4200) of the exhausting apparatus 400 are integrally held (fixed) with the attachment bracket 500 and fixed below the engine cover 140. An inlet of the exhaust gas to the exhausting apparatus 400 is an inlet 4111 of the oxidation catalyst 4100 described below, and an outlet of the exhaust gas from the exhausting apparatus 400 is an outlet 4212 of the Muffling device 4200 described below (see FIG. 12).

The oxidation catalyst 4100 in this embodiment is an exhausting device that also performs an oxidation treatment of nitric monoxide in the exhaust gas. The oxidation catalyst 4100 includes an oxidation catalyst (not shown) and a housing 4110 for enclosing the oxidation catalyst. The inlet 4111 of the exhaust gas and the outlet 4112 of the exhaust gas are provided in the housing 4110. The housing 4110 is a hollow member having a generally cylindrical shape that is provided with the inlet 4111 on one end and is closed on the other end. The outlet 4112 is provided in the external circumference surface of the housing 4110 in the vicinity of the other end.

The muffling device 4200 is a known muffling device having a housing 4210 in which the sound of the exhaust gas is muffled or silenced. The housing 4210 is a hollow member having a generally cylindrical shape and is closed on both ends. An inlet 4211 for the exhaust gas is provided in the external circumference surface of the housing 4210 in the vicinity of one end, while the outlet 4212 for the exhaust gas is provided in the external circumference surface in the vicinity of the other end. One end of an extension tubing 431 is connected to the outlet 4212. The other end of the extension tubing 431 is inserted into the lower part of the tail pipe 171 attached to the engine cover 140.

The outlet 4112 of the oxidation catalyst 4100 extends downwardly from the bottom of the housing 4110, while the inlet 4211 of the muffling device 4200 extends upwardly in the left side of the housing 4210. The oxidation catalyst 4100 is disposed at an obliquely upper left position with respect to the muffling device 4200. The outlet 4112 of the oxidation catalyst 4100 and the inlet 4211 of the muffling device 4200 take almost the same position in the longitudinal direction (front-rear direction) and in the lateral direction (right-left direction). The oxidation catalyst 4100 and the muffling device 4200 are connected to each other by inserting the inlet 4211 of the muffling device 4200 into the outlet 4112 of the oxidation catalyst 4100. The connecting part between the outlet 4112 of the oxidation catalyst 4100 and the inlet 4211 of the muffling device 4200 is tightened and fixed with an U-bolt 532.

Figure 10:
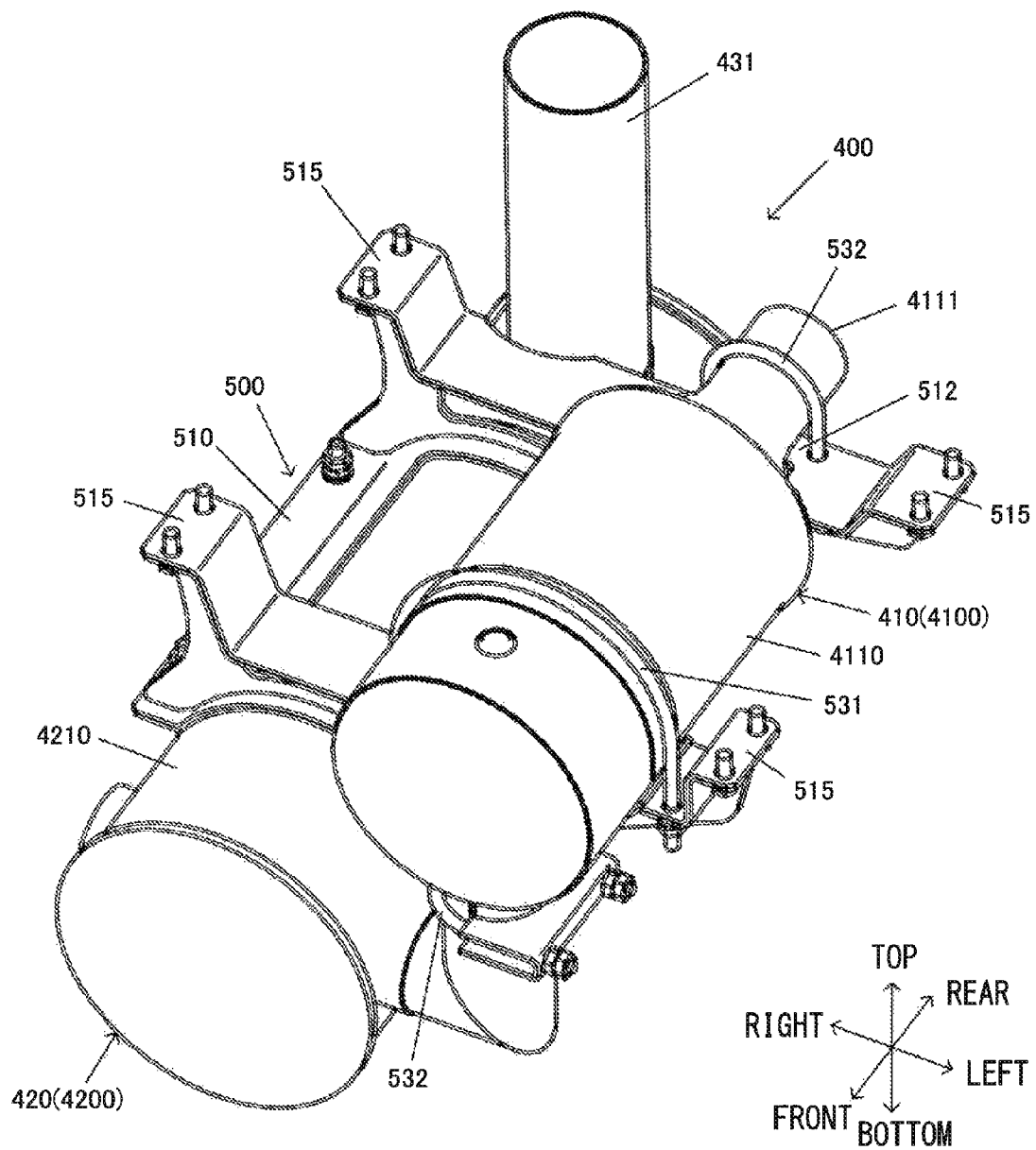
FIG. 10 is a perspective view showing a state in which an oxidation catalyst and a muffling device are integrally held with an attachment bracket.
Figure 11:
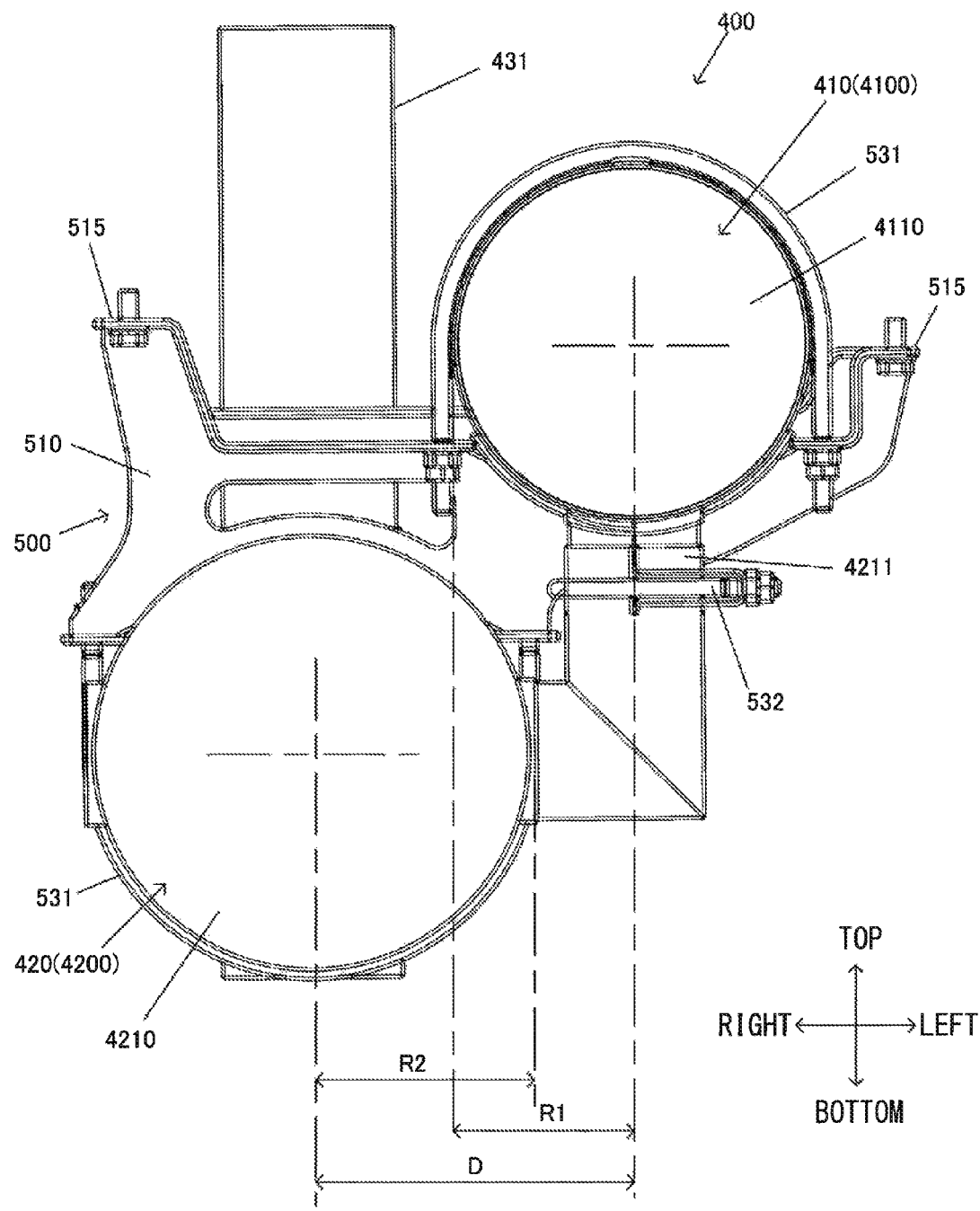
FIG. 11 is a front view showing a state in which the oxidation catalyst and the muffling device are integrally held with the attachment bracket.
Figure 12:
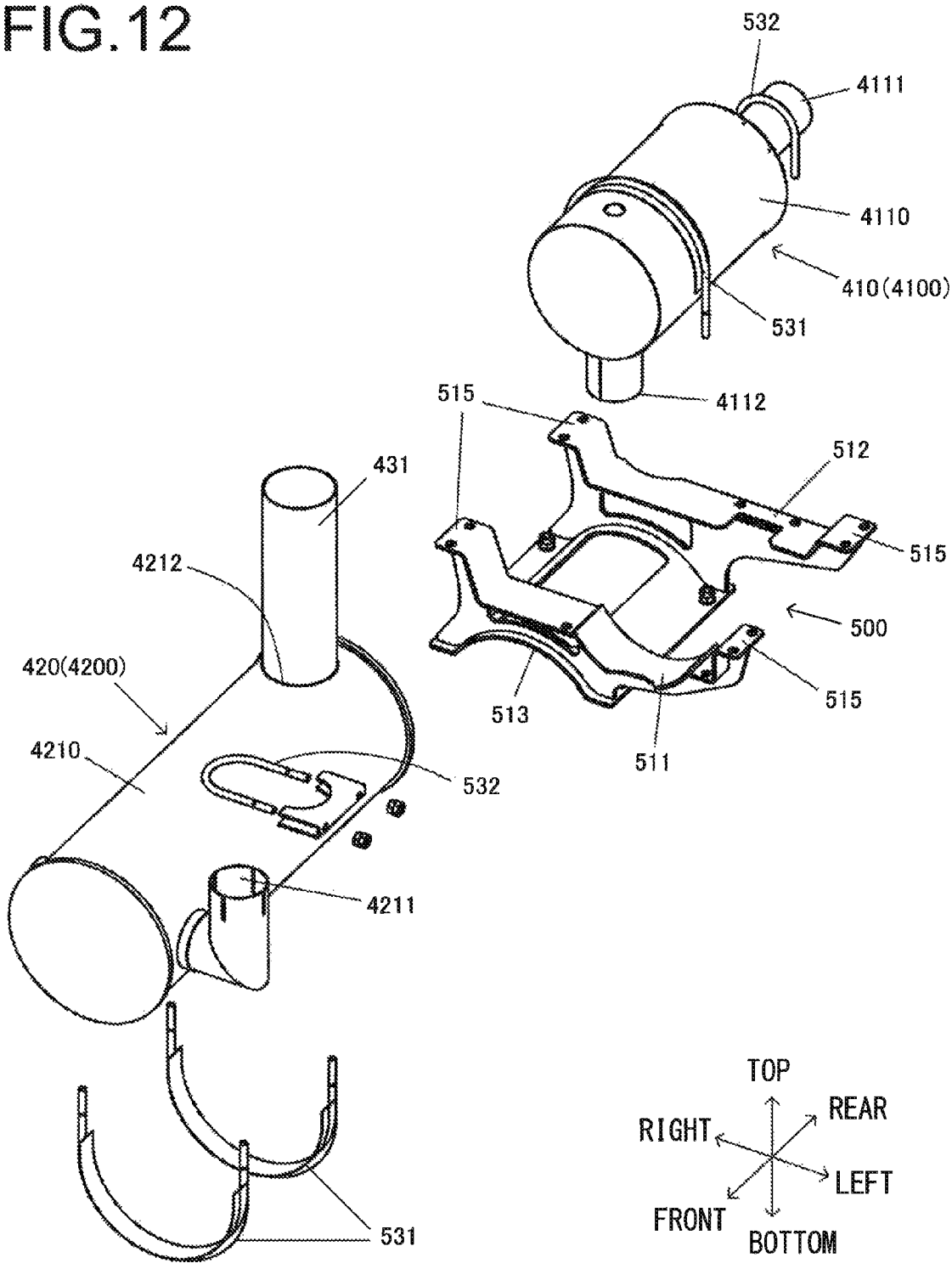
FIG. 12 is an exploded view of the attachment bracket.

FIG. 10 is a perspective view showing a state in which the oxidation catalyst 4100 and the muffling device 4200 are integrally held with the attachment bracket 500, and FIG. 11 is a front view showing a state in which the oxidation catalyst 4100 and the muffling device 4200 are integrally held with the attachment bracket 500. FIG. 12 is an exploded view of the attachment bracket 500. The attachment bracket 500 integrally holds the oxidation catalyst 4100 and the muffling device 4200 in a connected manner.

Specifically, the attachment bracket 500 has a bracket body 510. The bracket body 510 is provided with a first upper holding seat 511 and a second upper holding seat 512 for holding the oxidation catalyst 4100, and a lower holding seat 513 for holding the muffling device 4200. The first upper holding seat 511 is a holding seat that is provided on the front top surface of the bracket body 510 and supports the housing 4110 of the oxidation catalyst 4100 in the vicinity of the outlet 4112 from below. The oxidation catalyst 4100 is fixed to the first upper holding seat 511 by tightening the external circumference of the housing 4110 with a U-band 531. The position to be tightened in the external circumference of the oxidation catalyst 4100 is specified by the manufacturer of the oxidation catalyst 4100, in order to prevent damage of the oxidation catalyst (not shown) provided within the housing 4110.

The second upper holding seat 512 is a holding seat that is provided on the rear top surface of the bracket body 510 and supports the inlet 4111 of the oxidation catalyst 4100 from below. The oxidation catalyst 4100 is fixed to the second upper holding seat 512 by tightening the external circumference of the housing 4110 with a U-bolt 532.

The lower holding seat 513 is a holding seat that is provided on the right bottom surface of the bracket body 510 and holds the housing 4210 of the muffling device 4200 from above. The muffling device 4200 is fixed to the lower holding seat 513 by tightening the external circumference of the housing 4210 with the U-bands 531.

On the left and right side of the first upper holding seat 511 and on the left and right side of the second upper holding seat 512, attachment seats 515 for attaching the attachment bracket 500 to the bottom surface of the engine cover 140 (the bottom surface of the frame 142) are provided at a total of four points.

The attachment bracket 500 holds the oxidation catalyst 4100 and the muffling device 4200 in such a manner that an extending direction of the generally cylindrical housing 4110 of the oxidation catalyst 4100 and an extending direction of the generally cylindrical housing 4210 of the muffling device 420 are parallel. Furthermore, as shown in FIG. 11, the attachment bracket 500 holds the oxidation catalyst 4100 and the muffling device 4200 in such a manner that the oxidation catalyst 4100 is located at a position higher than that of the muffling device 420.

The attachment bracket 500 holds the oxidation catalyst 4100 and the muffling device 4200 so that a separation D between the center axis of the cross section of the oxidation catalyst 4100 and the center axis of the cross section of the muffling device 4200 in the lateral direction (right-left direction) has a relationship represented by the following equation (1), wherein R1 is a radius of the generally circular cross section of the housing 4110 of the oxidation catalyst 4100 and R2 is a radius of the generally circular cross section of the housing 4210 of the muffling device 4200.

$$D < R1 + R2 \qquad (1)$$

In other words, the oxidation catalyst 4100 and the muffling device 4200 can be held with the attachment bracket 500 so that the housings 4110 and 4210 overlap each other in the lateral direction, seen from above, because the center axis of the cross section of the oxidation catalyst 4100 and the center axis of the cross section of the muffling device 4200 are spaced in the vertical direction and extend at different heights. The attachment bracket 500 holds the oxidation catalyst 4100 and the muffling device 4200 in this manner, with the result that an installation space of the oxidation catalyst 4100 and the muffling device 4200 can be reduced in the lateral direction.

It is also possible that the oxidation catalyst 4100 and the muffling device 4200 are held with the attachment bracket 500 so that the housings 4110 and 4210 overlap each other in the vertical direction, seen from right and left, because the center axis of the cross section of the oxidation catalyst 4100 and the center axis of the cross section of the muffling device 4200 are spaced in the lateral direction. Therefore, an installation space of the oxidation catalyst 4100 and the muffling device 4200 can be reduced in the vertical direction.

—Mounting State of Exhausting Apparatus 400—

Figure 14:
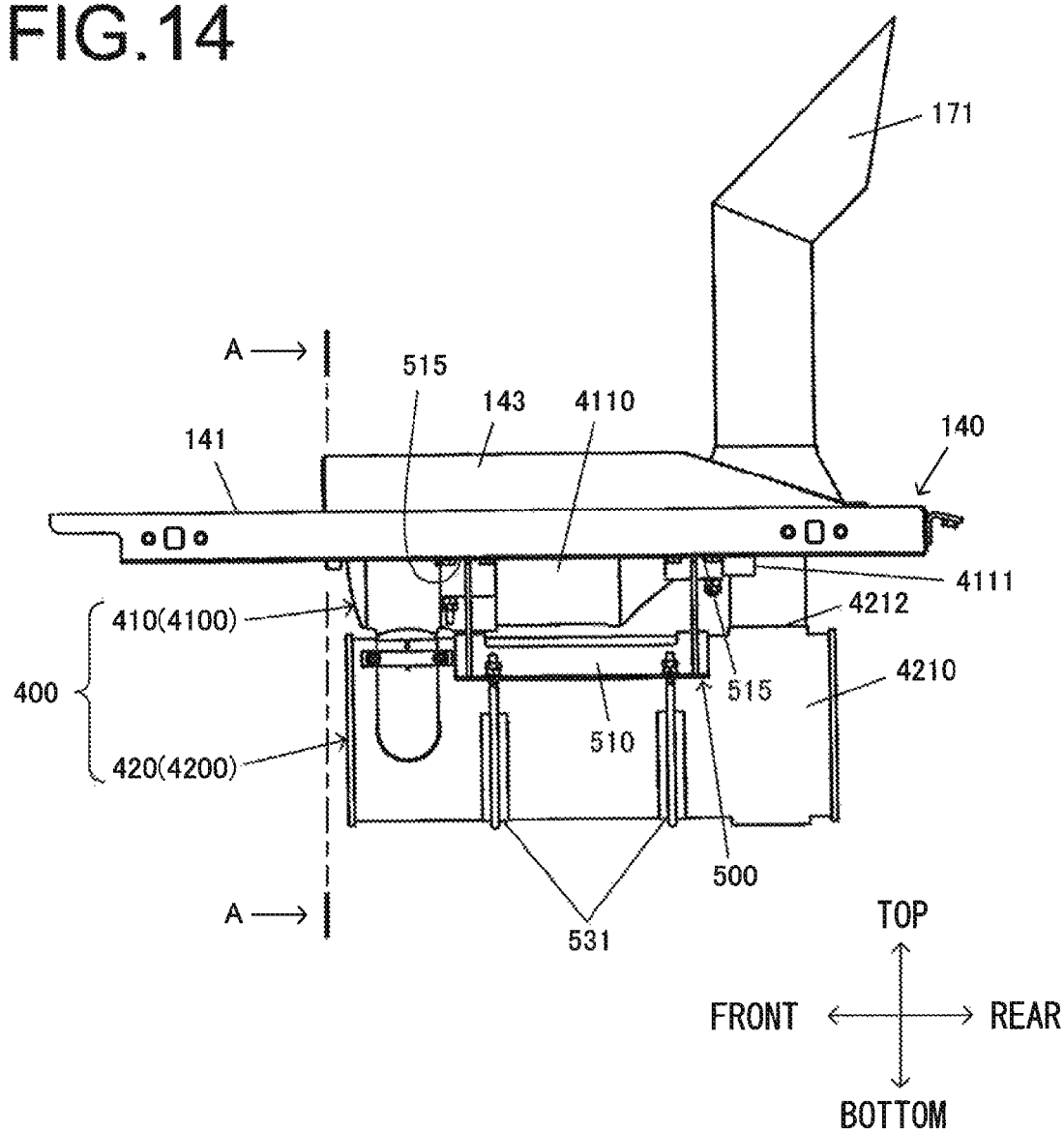
FIG. 14 is a side view showing a state in which the exhausting apparatus is attached to a bottom surface of the engine cover with the attachment bracket.
Figure 15:
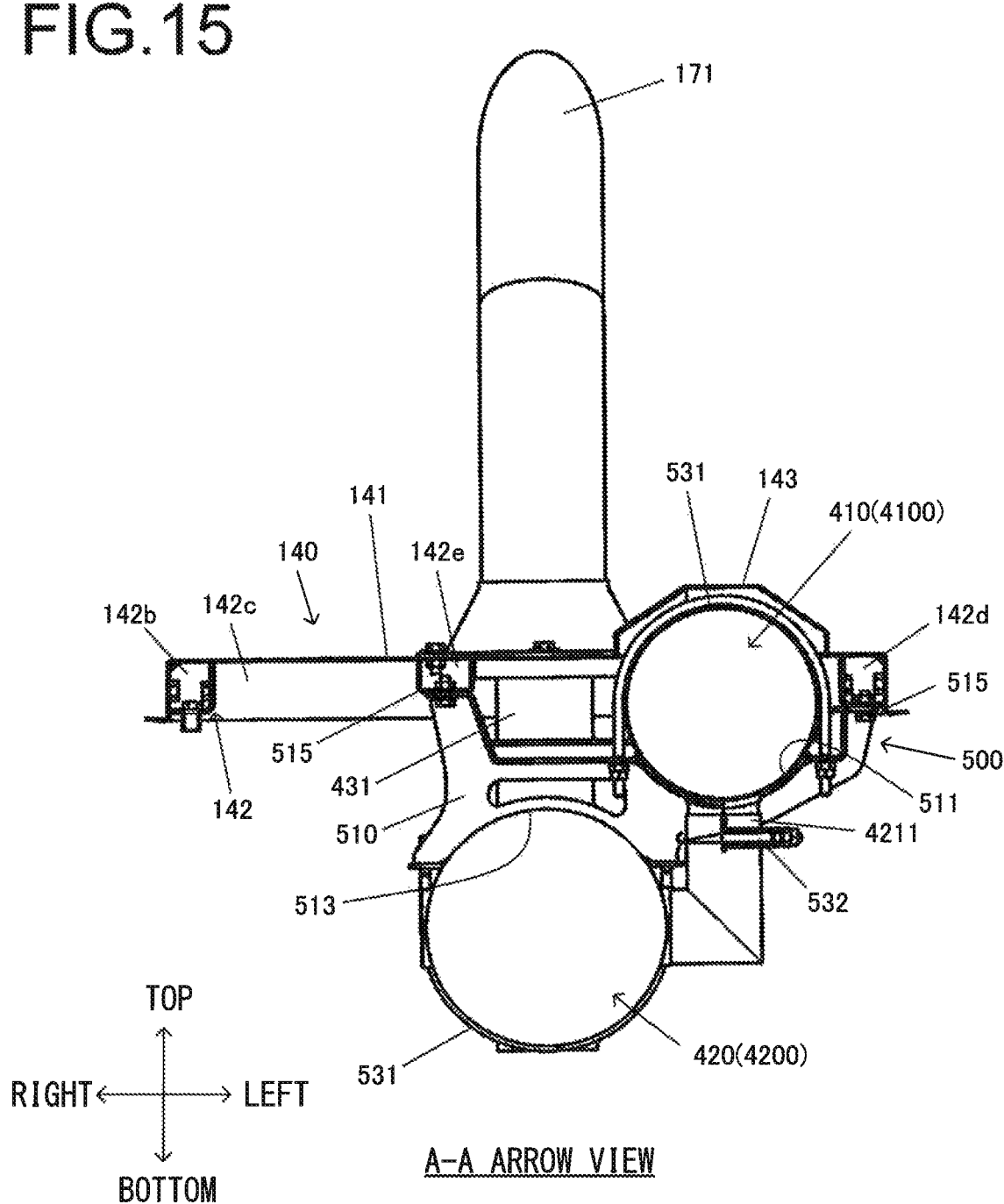
FIG. 15 is a cross sectional arrow view taken along a line A-A in FIG. 14.
Figure 16:
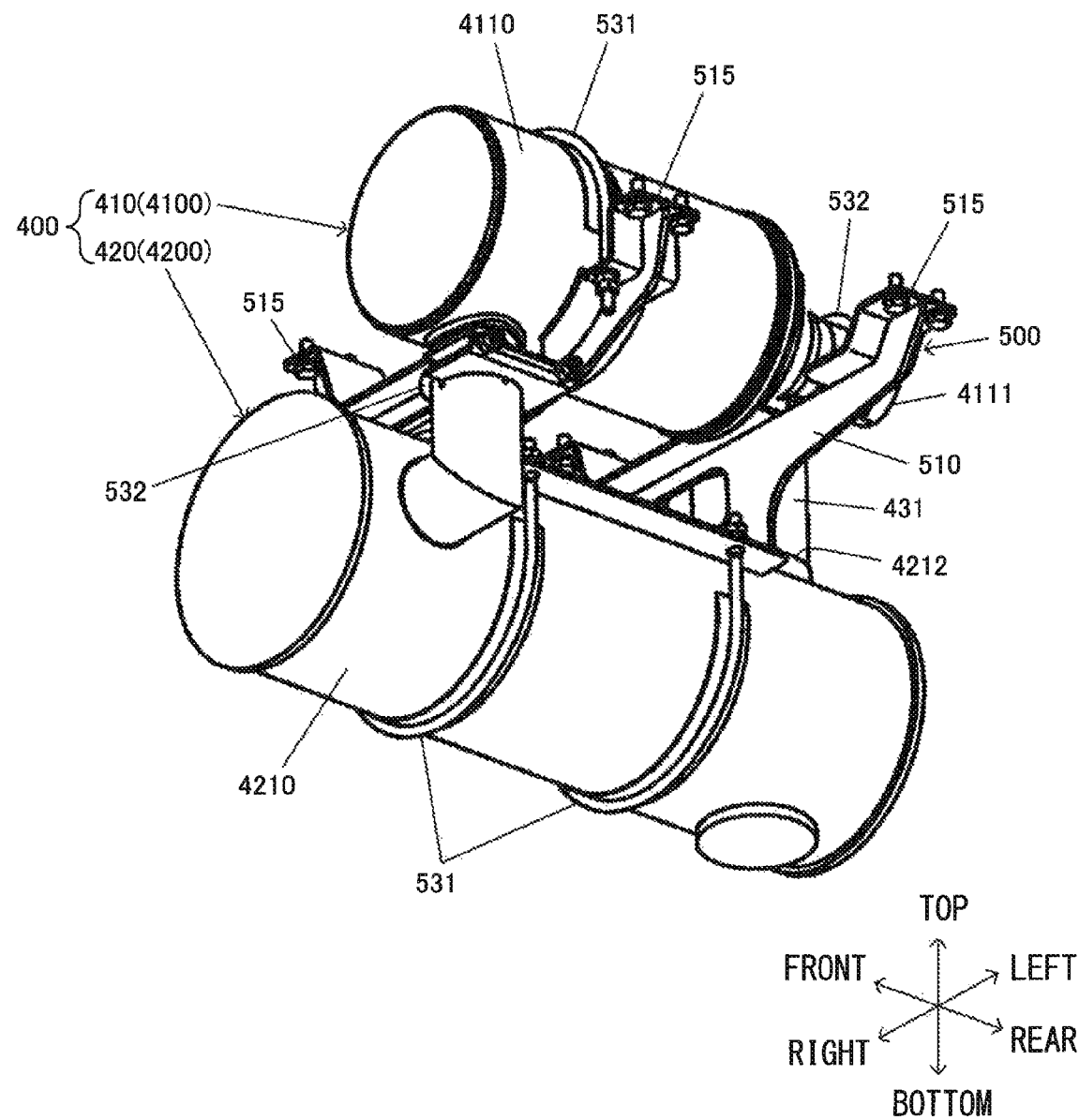
FIG. 16 is a bottom perspective view of the exhausting apparatus held with the attachment bracket, seen from left front.

As described above, FIG. 13 is a perspective view showing a state in which the attachment bracket 500 is attached to the engine cover 140. FIG. 14 is a side view showing a state in which the exhausting apparatus 400 is attached to the bottom surface of the engine cover 140 with the attachment bracket 500. FIG. 15 is a cross sectional arrow view taken along a line A-A in FIG. 14, and FIG. 16 is a bottom perspective view of the exhausting apparatus 400 held with the attachment bracket 500, seen from left front.

As described above, the attachment bracket 500 holding the exhausting apparatus 400 is fixed to the bottom surface of the engine cover 140. Specifically, as shown in FIGS. 13 and 15, the attachment seats 515 of the bracket body 510 are fixed on the bottom surface of the frame 142 (the reinforcing members 142d, 142e) of the engine cover 140 with fasteners such as bolts and nuts. Thereby, the extending direction of the generally cylindrical housing 4110 of the oxidation catalyst 4100 and the extending direction of the generally cylindrical housing 4210 of the muffling device 4200 substantially correspond to the longitudinal direction of the wheel loader 100. In this way, the attachment bracket 500 integrally holds the two exhausting devices 410 and 420 having respective different functions and fixes them on the bottom surface of the engine cover 140.

Thereby, the exhausting apparatus 400 is supported by the hydraulic oil tank 125 and the building cover supporting member 160, which are provided in an upright manner on the rear vehicle body 120, through the attachment bracket 500 and the frame 142 of the engine cover 140. Therefore, the oxidation catalyst 4100 and the muffling device 4200, which are heavy components, are fixed to the rear vehicle body with a sufficient strength.

If an exhausting apparatus was formed by integrating an oxidation catalyst and a muffling device, the apparatus would have less flexibility or versatility and the manufacturing cost would be increased. Furthermore, in this case, the length (axial length) of the exhausting apparatus would be longer. It is therefore desirable that the oxidation catalyst and the muffling device are not integrally, but separately installed. It is also necessary to provide the air cleaner 350 and others in a limited space above the engine 301, in addition to the exhausting apparatus 400.

Thus, in this embodiment, instead of the exhausting apparatus integrally having the oxidation catalyst 4100 and the muffling device 4200, the oxidation catalyst 4100 and the muffling device 4200 are separately (independently) provided. It will be noted that, in this embodiment, the oxidation catalyst 4100 as the first exhausting device 410 is provided at a position higher than that of the muffling device 4200 as the second exhausting device 420. The reason of this is the following. In order to suppress vibration transmission from the engine 301 side, a certain length of the bellow tube 361a in the exhaust tubing 361 connecting the turbocharger 302 and the oxidation catalyst 4100 should be provided. Furthermore, since the temperature of the surface of the muffling device 4200 becomes higher than that of the oxidation catalyst 4100, it is necessary to separate the muffling device 4200 further away from the engine cover 140 than the oxidation catalyst 4100.

With the wheel loader 100 in this embodiment described above, the following advantageous effect can be achieved.

(1) The oxidation catalyst 4100 and the muffling device 4200 having respective different functions are integrally held with the attachment bracket 500 so that the housings 4110 and 4210 overlap each other in the lateral direction, seen from above. Then, the attachment bracket 500 holding the oxidation catalyst 4100 and the muffling device 4200 is attached to the bottom surface of the engine cover 140. Thereby, an increase in weight and size in mounting a plurality of exhausting devices having respective different functions in the work machine can be suppressed. As a result, the exhausting devices can be disposed in a limited space in the engine room 122 or the like, a change in appearance of the work machine can be minimized, and additionally an increase in weight and size of the work machine can be suppressed. Therefore, an increase in cost of the work machine can be suppressed. Furthermore, the exhausting device can be disposed in other work machines, because the flexibility of disposing the exhausting device in the work machines is not impaired. As a result, procurement cost can be reduced because the exhausting device can be procured together with exhausting devices to be disposed in other work machines so that the number of exhausting devices procured at a time is increased.

(2) The oxidation catalyst 4100 and the muffling device 4200 are integrally held with the attachment bracket 500 so that the center axis of the housing 4110 extending in the longitudinal direction and the center axis of the housing 4210 extending in the longitudinal direction do not overlap each other, seen from above. As a result, the oxidation catalyst 4100 and the muffling device 4200 can be held with the attachment bracket 500 so that the housings 4110 and 4210 overlap each other in the vertical direction, seen from right and left. Therefore, because an installation space of the oxidation catalyst 4100 and the muffling device 4200 can be reduced in the vertical direction, the exhausting devices can be disposed in a limited space in the engine room 122 or the like, a change in appearance of the work machine can be minimized, and additionally an increase in weight and size of the work machine can be suppressed. Therefore, an increase in cost of the work machine can be suppressed.

(3) The oxidation catalyst 4100 and the muffling device 4200 are provided as the exhausting apparatus 400 of the engine 301 which is a diesel engine. Thereby, unburned fuel or the like in the exhaust gas can be burned, nitric monoxide can be oxidized, and particulate substances can be treated, as well as suppressing noise. Therefore, an increase in weight and size of the work machine can be suppressed, while alleviating the influence on the environment.

—Variations—

Figure 17:
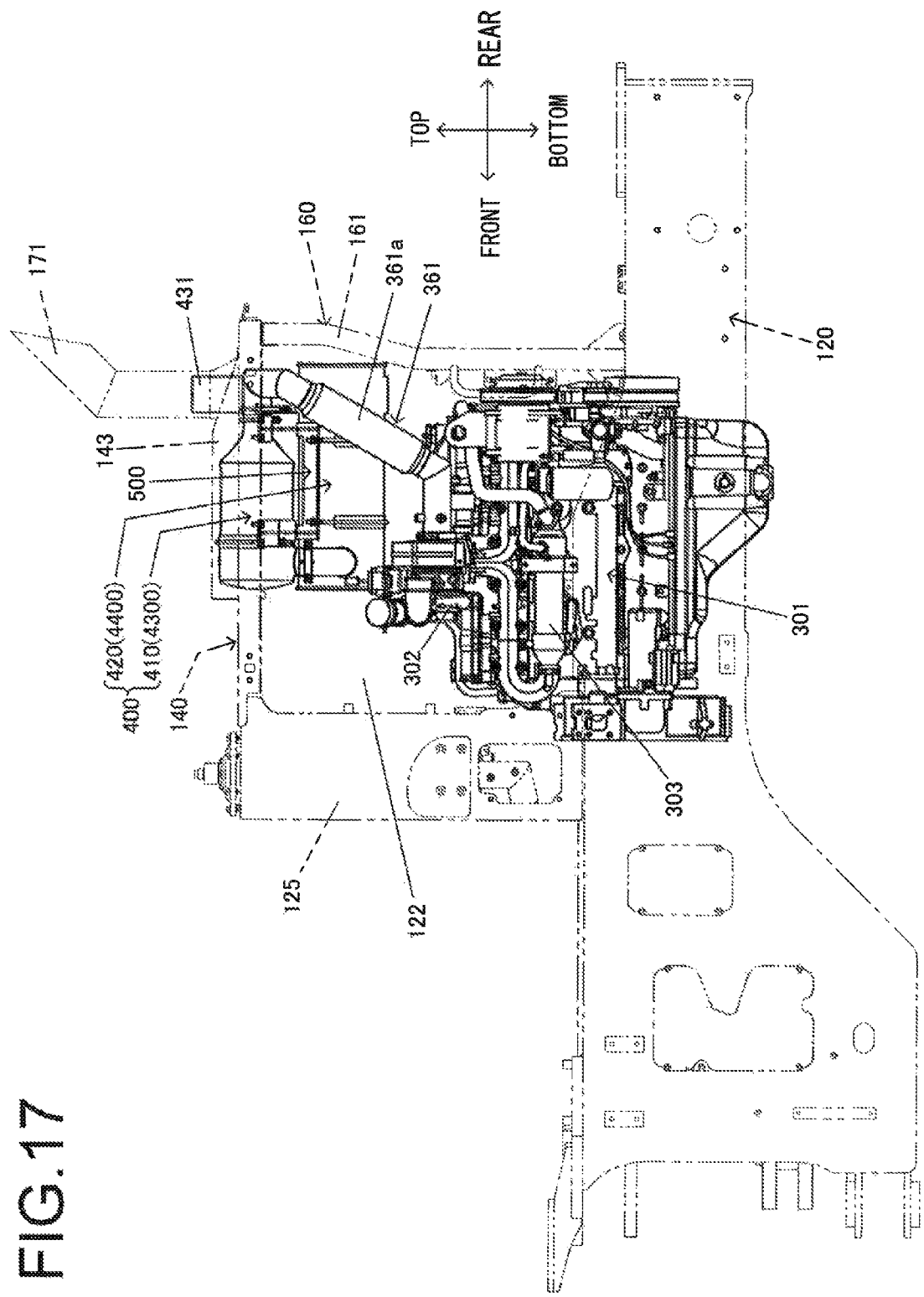
FIG. 17 is a view showing a variation.
Figure 18:
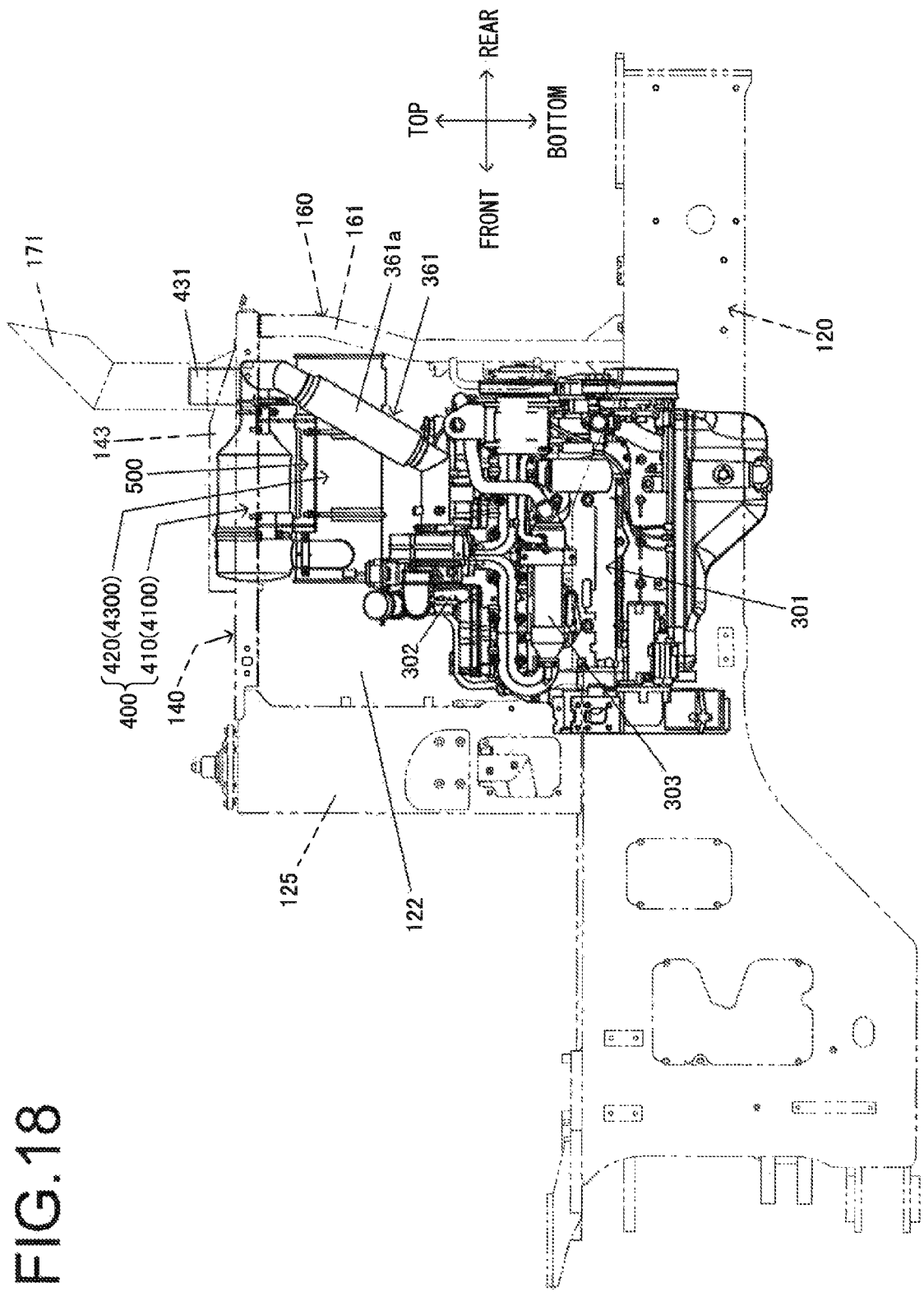
FIG. 18 is a view showing a variation.

(1) Although, in the foregoing description, the oxidation catalyst 4100 with the muffling function is used as the first exhausting device 410 and the muffling device 4200 is used as the second exhausting device 420, these are only exemplary and the present invention is not limited to this embodiment. For example, an urea SCR (Selective Catalytic Reduction) device 4300 may be used as the first exhausting device 410, and a DPF (Diesel Particulate Filter) device 4400 may be used as the second exhausting device 420, as shown in FIG. 17. Furthermore, for example, the oxidation catalyst 4100 may be used as the first exhausting device 410 and the urea SCR (Selective Catalytic Reduction) 4300 may be used as the second exhausting device 420, as shown in FIG. 18.

(2) Although, in the foregoing description, the exhaust gas flows into the exhausting apparatus 400 through the inlet 4111 rearwardly projecting in the rear part of the oxidation catalyst 4100 and flows out through the outlet 4212 provided in the rear top surface of the muffling device 4200, these are only exemplary and the present invention is not limited to this embodiment. For example, the exhaust gas may flow into the exhausting apparatus 400 through the rear side surface of the oxidation catalyst 4100. Furthermore, for example, the exhaust gas may be exhausted through the outlet configured to project rearwardly in the rear part of the muffling device 4200. In the case where the exhaust gas is exhausted through the outlet configured rearwardly in the rear part of the muffling device 4200, it is desirable to guide the exhaust gas to the tail pipe 171 by attaching an upwardly bent tubing to the outlet.

(3) Although, in the foregoing description, the first exhausting device 410 is attached at a position higher than a position of the second exhausting device 420 with respect to the attachment bracket 500, the present invention is not limited to this embodiment. For example, the first exhausting device 410 may be attached at a lower position than a position of the second exhausting device 420 with respect to the attachment bracket 500.

(4) Although, in the foregoing description, the extending direction of the generally cylindrical housing 4110 of the oxidation catalyst 4100 and the extending direction of the generally cylindrical housing 4210 of the muffling device 4200 substantially correspond to the longitudinal direction (front-rear direction) of the wheel loader 100, the present invention is not limited to this embodiment. For example, the extending direction of the housing 4110 and the extending direction of the housing 4210 may substantially match with the lateral direction (right-left direction) of the wheel loader 100. Furthermore, although the housing 4110 and the housing 4210 are generally cylindrical in the foregoing description, the present invention is not limited to this embodiment. For example, the cross section in a plane perpendicular to the extending direction of the housing 4110 and the housing 4210 may not be a circle in shape, but an ellipse or a polygon, or a combination of circles, ellipses, polygons, and others. In other words, the housings 4110 and 4210 may have an elongate shape and each of the first exhausting device 410 and the second exhausting device 420 may have an elongate appearance.

(5) Although the engine 301 is a diesel engine in the foregoing description, the present invention is not limited to this embodiment. For example, other forms of internal combustion engines may be used, such as gasoline engines.

(6) Any of the above-described embodiments and variations may be combined to each other.

The present invention is not limited to the above-described embodiments in any way and the present invention encompasses any work machine having a variety of structures, characterized by comprising: a vehicle body frame of the work machine; an engine mounted on the vehicle body frame; an engine cover covering over the top of the engine and fixed to the vehicle body frame via a column; a first exhausting device having a tubular appearance; a second exhausting device having a tubular appearance and having a function different from that of the first exhausting device; and a bracket holding the first exhausting device in an upper holding part and the second exhausting device in a lower holding part to attach them on the bottom surface of the engine cover, wherein: the bracket integrally holds the first and second exhausting devices in such a manner that an extending direction of the first exhausting device and an extending direction of the second exhausting device are generally parallel, seen from above, and a part of the first exhausting device and a part of the second exhausting device overlap each other, seen from above, while fixing the first and second exhausting devices below the engine cover.

The disclosure of the following priority application is herein incorporated by reference:

Japanese Patent Application No. 2013-80396 (filed Apr. 8, 2013)

REFERENCE SIGNS LIST

100 . . . wheel loader, 120 rear vehicle body (frame), 125 . . . hydraulic oil tank, 140 . . . engine cover, 141 . . . ceiling plate, 142 . . . frame, 160 . . . building cover supporting member, 400 . . . exhausting apparatus, 500 . . . attachment bracket, 510 . . . bracket body, 511 . . . first upper holding seat, 512 . . . second upper holding seat, 513 . . . lower holding seat, 515 . . . attachment seat, 410 first exhausting device, 420 . . . second exhausting device, 4100 . . . oxidation catalyst with muffling function (oxidation catalyst or DOC (Diesel Oxidation Catalyst)), 4110 . . . , housing, 4200 . . . muffling device, 4210 . . . housing

The invention claimed is:

1. A work machine, comprising:
a vehicle body frame of the work machine;
an engineer that is mounted on the vehicle body frames and that includes a turbocharger;
an engine cover covering over a top of the engine and fixed to the vehicle body frame via a column;
a first exhausting device having a tubular appearance;
a second exhausting device having a tubular appearance and having a function different from that of the first exhausting device, the second exhausting device being disposed at a position lower than a position of the first device; and
a bracket that includes an upper holding part that holds the first exhausting device, a lower holding part that holds the second exhausting device, an attachment seat that attaches a bottom surface of the engine cover, and a body part at which the upper holding part, the lower holding part, and the attachment seat are mounted, wherein:
the bracket integrally holds the first and second exhausting devices in such a manner that an extending direction of the first exhausting device and an extending direction of the second exhausting device are generally parallel, seen from above, and a part of the first exhausting device and a part of the second exhausting device overlap each other, seen from above,
the first and second exhausting devices being integrally held by the bracket and being fixed below the engine cover by the attachment seat, and
an exhaust tubing including a bellow tube is provided to connect the turbocharger with the first exhausting device that is disposed at a position higher than that of the second exhausting device.

2. The work machine according to claim 1, wherein:
the bracket integrally holds the first and second exhausting devices in such a manner that a center axis extending in the extending direction of the first exhausting device and a center axis extending in the extending direction of the second exhausting device do not overlap each other, seen from above.

3. The work machine according to claim 1, wherein:
the engine is a diesel engine;
the first exhausting device is an oxidation catalyst device; and
the second exhausting device is a muffling device.

4. The work machine according to claim 1, wherein:
the engine is a diesel engine;
the first exhausting device is an urea SCR (Selective Catalytic Reduction) device; and
the second exhausting device is a DPF (Diesel Particulate Filter) device.

5. The work machine according to claim 1, wherein:
the engine is a diesel engine;
the first exhausting device is an oxidation catalyst device; and
the second exhausting device is an urea SCR (Selective Catalytic Reduction) device.

* * * * *